Nov. 17, 1931.  G. H. CAIL  1,832,617

SPRING HANGER

Filed May 2, 1930

INVENTOR
George H. Cail

BY

Elliott Stoddard

ATTORNEY

Patented Nov. 17, 1931

1,832,617

UNITED STATES PATENT OFFICE

GEORGE HENRY CAIL, OF CEDAR RAPIDS, IOWA

SPRING HANGER

Application filed May 2, 1930. Serial No. 449,809.

My invention relates to spring hangers and an object of my improvements is to provide an improved means for securing springs to automobiles that shall permit of some slight relative movement due to change of angularity or the like, so that undue strains shall be obviated.

I secure this object by the construction shown in the accompanying drawings, in which:—

Figure 1:
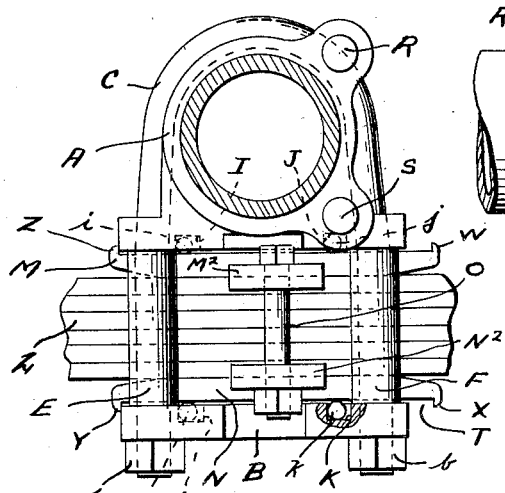
Figure 1 is a side elevation of apparatus embodying my invention.
Figure 2:
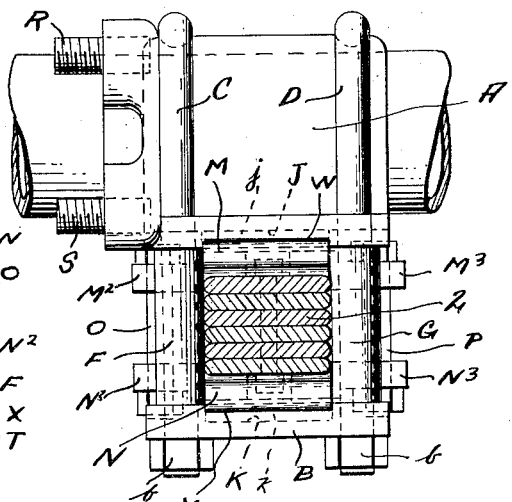
Figure 2 is an elevation looking from the right of Figure 1.
Figure 3:
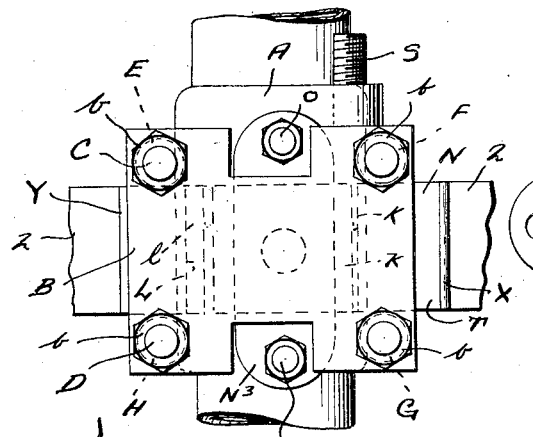
Figure 3 is an inverted plan view of the apparatus as shown in Figure 1.
Figures 4, 5:
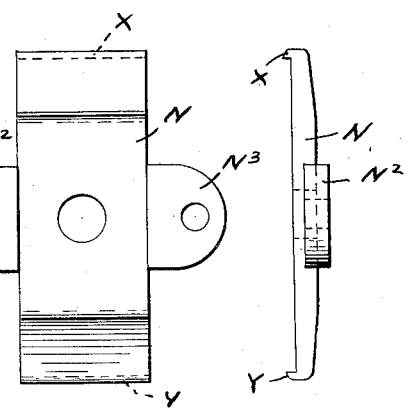
Figure 4 is a top plan view of one of the clamping plates.
Figure 5 is a side view of the same, looking from the left of Figure 4.
Figure 6:
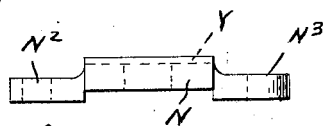
Figure 6 is an end view of the plate shown in Figure 1, the plate being inverted.

A is the axle fitting provided with lug screws R and S, to which are secured the brace rods, which extend to the drive shaft housing in a V-shape. C and D are U-bolts and B is the usual cross plate upon the ends of said bolts. E, F, G, and H are sleeves upon the U-bolts C D located between the base of the fitting A and the plate B, so as to space said plate from said fitting. b indicates the nuts upon the ends of the U-bolts C D, clamping the plate B in position. 2 is the spring extending between the fitting A and the plate B.

I, J, K, and L are grooves about one quarter of an inch in depth, cut transversely in adjacent faces of the fitting A and of the plate B. These grooves are of a length equal to the width of the spring. $i$, $j$, $k$, and $l$ are rollers in the grooves I, J, K, and L.

M and N are clamp plates located, one between the base of the fitting A and the spring 2, and the other between the inner surface of the plate B and said spring. Adjacent faces of the clamp plates M and N are curved longitudinally and the outer faces of said plates are smooth and level. The ends of the plates M and N turn outward to form transverse lugs W, X, Y, and Z.

The plates M and N have laterally extending lugs M2, M3 and N2, and N3, at their centers and through these lugs pass bolts O and P which bind said plates firmly against the spring 2.

The base of the fitting A and the plate B engage against the flat outer surface of the clamping plates M and N through the rollers $i$, $j$, $k$, and $l$ and the lugs W, X, Y, and Z limit the movement of the plates M and N relative to the base of the fitting A and the plate B.

The space T between an end of the base of the fitting A, an end of the plate B and the lugs W, X, Y, and Z, measures the longitudinal movement of the spring relative to its fastening and the curved inner surfaces of the plates M and N permit of a slight angular movement between the spring and plates.

What I claim is:

1. In an automobile the combination of an axle and a spring means for securing the spring to said axle longitudinally movable relative to said spring and clamping plates secured to said spring within said securing means and having a lug adapted to limit the movement of said securing means relative to said spring.

2. In an automobile the combination of an axle and a spring means for securing the spring to said axle longitudinally movable relative to said spring and clamping plates secured to said spring within said securing means and having a lug adapted to limit the movement of said securing means relative to said spring, said plates having their adjacent faces engaging against the surface of said spring curved in a direction longitudinal of said spring.

3. In an automobile the combination of an axle and a spring means for securing the spring to said axle longitudinally movable relative to said spring and clamping plates secured to said spring within said securing means and having a lug adapted to limit the movement of said securing means relative to said spring, said plates having their adjacent faces engaging against the surface of said spring curved in a direction longitudinal of said spring, said plates being secured together at their longitudinal centers.

4. The combination of a fitting, and a bar secured together, spacing means between said parts, a spring between said bar and fitting and a lug secured to said spring adapted to limit the relative motion of said bar and fitting longitudinally of said spring.

5. The combination of a fitting, and a bar secured together, spacing means between said parts, a spring, clamping plates engaging said spring between them, and located between said bar and fitting, one of said plates having a lug adapted to limit the relative motion of said fitting and bar longitudinally of the spring.

6. The combination of a fitting, and a bar, secured together, spacing means between said parts, a spring, clamping plates engaging said spring between them, and located between said bar and fitting, one of said plates having a lug adapted to limit the relative motion of said fitting and bar longitudinally of the spring, said plates having inner surfaces curving outwards toward their ends longitudinally of said spring.

7. The combination of a fitting, and a bar, U-bolts securing said parts together, spacing sleeves upon said bolts between said parts, clamping plates engaging said spring between them and having laterally extending lugs at their centers, clamping bolts engaging said lugs, said plates being located between said fitting and said bar.

8. The combination of a fitting, and a bar, U-bolts securing said parts together, spacing sleeves upon said bolts between said parts, clamping plates engaging said spring between them and having laterally extending lugs at their centers, clamping bolts engaging said lugs, said plates being located between said fitting and said bar, one of said clamping plates having a lug adapted to limit the motion of said fitting and bar longitudinally of said spring.

9. In an automobile the combination of an axle and a spring means for securing the spring to said axle longitudinally movable relative to said spring, and clamping plates secured to said spring within said securing means.

In testimony whereof, I sign this specification.

GEORGE HENRY CAIL.